Oct. 19, 1943.  F. G. RICHARDS  2,332,470
MASK FOR DIMMING LIGHT SOURCES
Filed Dec. 24, 1941  2 Sheets-Sheet 1
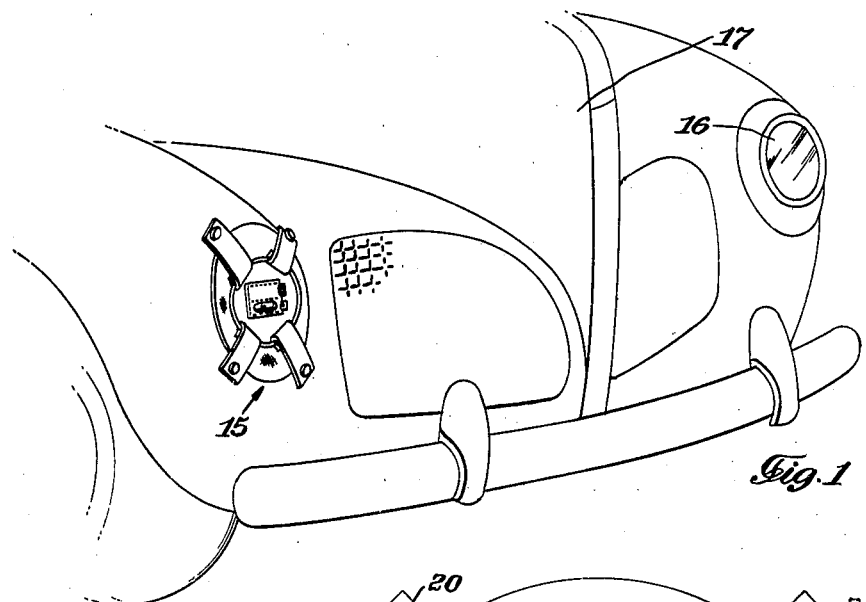
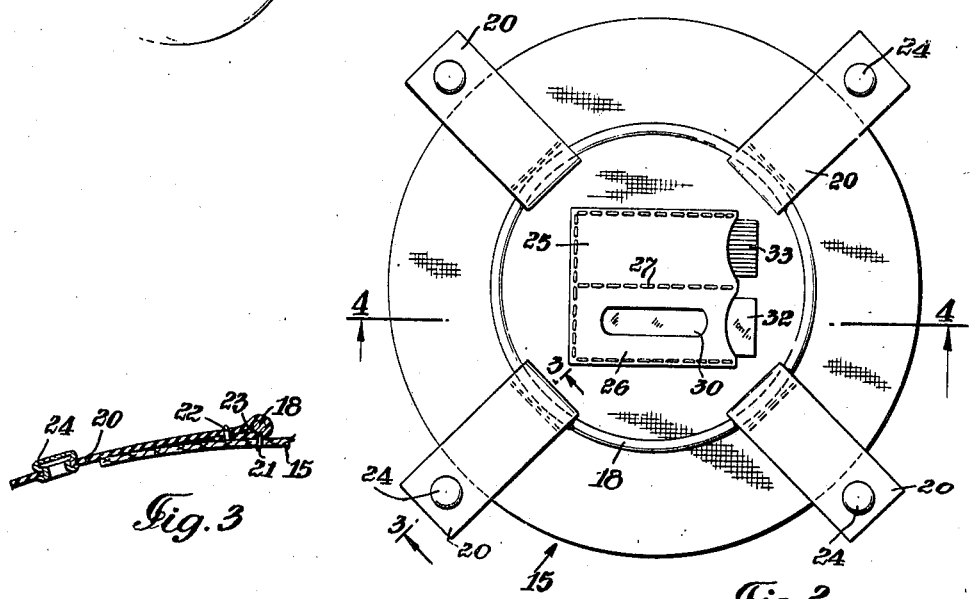
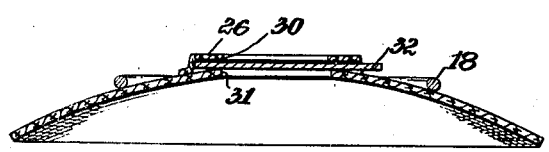
INVENTOR:
Frederick G. Richards
BY
ATTORNEY Oct. 19, 1943.     F. G. RICHARDS     2,332,470
MASK FOR DIMMING LIGHT SOURCES
Filed Dec. 24, 1941     2 Sheets-Sheet 2
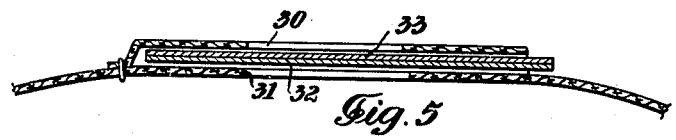
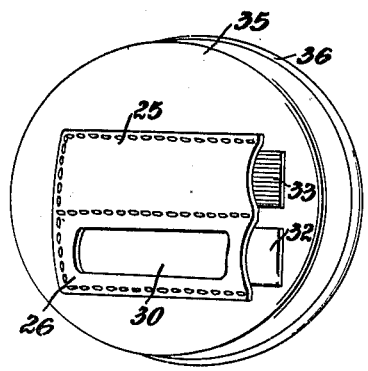
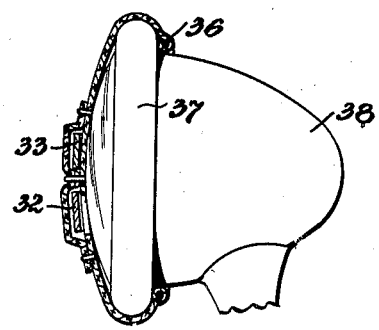
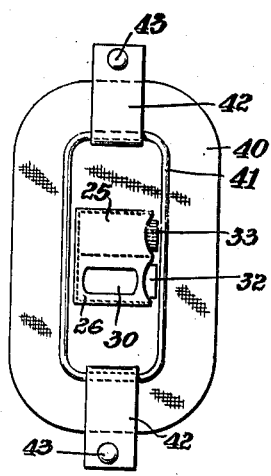
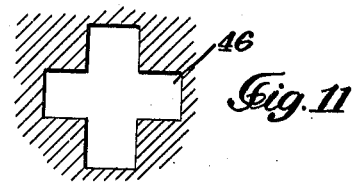
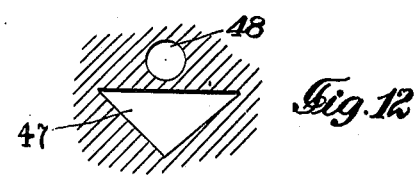
INVENTOR:
Frederick G. Richards
BY C. ? Freeman
ATTORNEY Patented Oct. 19, 1943

2,332,470

UNITED STATES PATENT OFFICE 2,332,470

MASK FOR DIMMING LIGHT SOURCES

Frederick G. Richards, New York, N. Y.

Application December 24, 1941, Serial No. 424,373

3 Claims. (Cl. 240—48.4)

This invention relates to a device which permits the dimming or complete extinguishing of light sources. More particularly, the invention relates to a mask which can easily be attached or secured to the headlights or search-lights of vehicles of any type such as automobiles, streetcars or the like.

The mask of the invention covers the headlight or tail light of an automobile and consists of a cap of a durable opaque material such as black cloth or cotton or black oil cloth. The mask is provided with one or more apertures. Preferably a pocket is provided on the cap for receiving one or more light filters of a flexible material.

The light filters are colored for instance blue or black so that the light may be partly or completely extinguished. The cap may be provided with a plurality of strips having snap fasteners which are secured behind the rim of the headlights or tail lights of an automobile or car. Alternatively, the cap may be provided with an elastic band which engages behind the face of a headlight or search-light.

The mask of the invention is particularly adapted for war-time black-outs.

According to the air raid protection regulations the light must be dimmed so that either a small pencil of white light passes the mask, or the light pencil may be of a dark blue color or the light must be completely extinguished as in total black-outs.

It is accordingly an object of the invention to provide an efficient device for dimming or completely extinguishing the light of any light source.

Another object of the invention is to provide a mask which can be quickly attached to the headlights, tail-lights or search-lights of any type of vehicle.

Still another object of the invention is to provide a cap of a durable opaque material having one or more apertures through which the light passes and a pocket for receiving one or more light filters which serve for covering the apertures in the cap.

These and further objects of the invention will become more evident when the description proceeds taken in connection with the drawings, wherein:

Fig. 1 is a view in perspective of the front portion of an automobile showing the mask of the invention applied to one of the headlights.

Fig. 2 is a plan view of the mask of the invention.

Fig. 3 is a section taken on the line 3—3 of Fig. 2.

Fig. 4 is a section taken on the line 4—4 of Fig. 2.

Fig. 5 is a sectional view similar to Fig. 4 showing the aperture in the mask covered by a light filter.

Fig. 6 is a side view of a headlight showing a modification of the mask in section.

Fig. 7 is a front view of the mask of Fig. 6.

Fig. 8 is a plan view of another embodiment of the mask of the invention which is particularly adapted for the tail light of an automobile.

Figs. 9 to 12 are plan views of a portion of the mask of the invention showing various shapes of the apertures therein.

Referring to the drawings and more particularly to Fig. 1 the mask of the invention generally designated with 15 is applied to one of the headlights 16 of car 17. The mask shown more particularly in Figs. 2 to 5 consists of a durable opaque material such as black cloth particularly black cotton, or black oilcloth. Mask 15 is provided with a metal ring 18 which is secured to the mask by means of strips 20 four of which are shown in Fig. 2.

As shown particularly in Fig. 3 strips 20 are stitched or otherwise secured to mask 15 at 21. Strip 20 forms a loop the free end of which is secured to the strip at 22 for instance by stitching. Hence metal ring 18 is received in loop 23. The remaining portions of metal ring 18 are not covered. Each of the strips 20 is provided with one portion of a snap fastener 24. The corresponding portions of the snap fasteners are secured for instance by screwing in spaced relationship on the rim of the headlight.

Hence, it will be obvious that mask 15 can be positioned over the headlight by pressing snap fastener member 24 against the fixed portion of the snap fastener on the rim of the headlight. Metal ring 18 serves as a positioning member and registers with the periphery of the face of the headlight so that the portion of the mask between metal ring 18 is stretched over the front lens of the headlight as particularly shown in Fig. 4.

The portion of the mask within metal ring 18 is provided with two pockets 25 and 26 which are separated from each other by stitching or glueing along the line 27. Pocket 26 has an aperture 30 of any appropriate size and shape, which registers with opening 31 in mask 15 as clearly shown in Figs. 4 and 5. Aperture 31 is covered with a transparent filter 32 which may for instance be of Celluloid or gelatine. Pocket 25 is adapted to receive one or more light filters 33 as shown in Fig. 2. Light filters 33 may be of any desired color including blue and black.

When it is desired to dim the light emanating from the headlights, one of the filters 33 is inserted into pocket 26 as shown in Fig. 5. Hence, the beam of light defined by openings 30, 31 may be made of any desired color, or the light may be completely extinguished by using a black filter.

Another embodiment of the invention is shown in Figs. 6 and 7. Mask 35 is provided along its edge with an elastic cord 36 which tensions the mask as shown in Fig. 6. Cord 36 engages behind rim 37 of headlight 38. Mask 35 is provided with pockets 25 and 26, the latter having an opening 30 as described in connection with Figs. 2 to 5.

Still another modification of the invention is shown in Fig. 8. Mask 40 shown therein is particularly adapted to cover the tail-light of an automobile. The mask is provided with a positioning metal ring 41 which is secured by strips 42 provided with snap fasteners 43. The central portion of mask 40 is provided with pockets 25, 26 one of which has an opening 30 as described in connection with Figs. 2 to 5.

Openings 30 and 31 may have various shapes as shown in Figs. 9 to 12. Fig. 9 shows an elongated opening 39. Fig. 10 shows a triangular opening 45, Fig. 11 a cross-shaped opening 46, while Fig. 12 shows two apertures 47, 48 consisting of a triangle and a superimposed circle.

The different shapes of openings 30, 45, 46 and 47, 48 may be used to distinguish for instance ordinary cars from taxis, ambulances, police cars, fire engines, and so forth.

It will now be evident that the mask of the invention may be secured to any light source of a vehicle easily and efficiently. The light can be dimmed, colored in any desired color or completely extinguished by simply exchanging different filters. If no light filter is used the apertures in the mask greatly reduce the size of the light beam. The device of the invention is particularly adapted to be used for partial blackouts and complete blackouts. When the light sources of an automobile are covered with the mask of the invention having a black filter, accidental switching on of the head or tail lights in a blackout is rendered harmless.

Various changes and modifications may be made to the details of construction of the invention without departing from the broader spirit and scope thereof, as set forth in the following claims.

I claim:

1. In combination with an automobile headlight, a flexible, opaque, substantially waterproof material comprising a lens shield, overlying the headlight lens and supported by the headlight, an opening in said shield having a predetermined relation with respect to the maximum light-emitting value of said lens, a plurality of pockets positioned in respect to said opening, one of said pockets having an aperture therein in alignment with the opening in said shield, the other pocket having an opaque covering and being proof against the emission of light, a plurality of filter slides, each slide comprising a separate unit independently removable from the opaque pocket and insertable in the apertured pocket, the opaque pocket constituting a storage receptacle for filters in non-operative filtering position.

2. A device according to claim 1, in which the pockets are rectangular in shape and the material forming the same is stitched to the shield material, and in which the material surrounding the opening in the shield and the material surrounding the opening in the apertured pocket form a support for the filter and retain it in position.

3. In a device according to claim 1, in which the aperture covering member is constituted wholly by a filter member and complete blackout to maximum light-emitting is controlled solely by said filter members.

FREDERICK G. RICHARDS.